United States Patent

Bateman

[11] 4,210,744
[45] Jul. 1, 1980

[54] ADDUCTS CONTAINING EPOXIDE GROUPS, FROM HYDANTOIN TRISEPOXIDES AND BINUCLEAR HYDANTOINS

[75] Inventor: John H. Bateman, Bardonia, N.Y.

[73] Assignee: Ciba-Geigy Corporation, Ardsley, N.Y.

[21] Appl. No.: 968,149

[22] Filed: Dec. 11, 1978

[51] Int. Cl.$^2$ .................. C08G 59/02; C08G 59/26
[52] U.S. Cl. .................. 528/363; 260/18 PN; 528/117; 528/367; 548/310
[58] Field of Search .................. 528/367, 363, 117; 260/830 P, 18 PN, 830 S, 834, 835

[56] References Cited

U.S. PATENT DOCUMENTS

| | | | |
|---|---|---|---|
| 3,779,949 | 12/1973 | Porret et al. | 260/2 N |
| 3,799,894 | 3/1974 | Porret et al. | 260/2 EP |
| 3,907,719 | 9/1975 | Habermeier et al. | 260/2 EC |
| 3,963,667 | 6/1976 | Schreiber et al. | 260/37 EP |
| 4,071,477 | 1/1978 | Seltzer et al. | 260/2 N |

Primary Examiner—Earl A. Nielsen
Attorney, Agent, or Firm—Joseph F. DiPrima

[57] ABSTRACT

An advanced addition product containing 1,2-epoxide groups is prepared from the reaction of a hydantoin compound of the formula

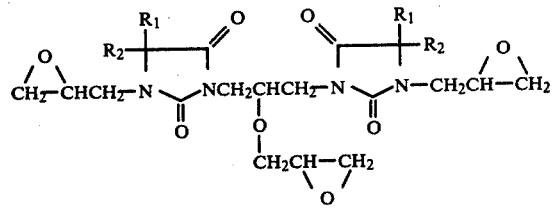

wherein $R_1$ is hydrogen, alkyl containing 1 to 8 carbon atoms or cycloalkyl containing 5 to 6 carbon atoms; and $R_2$ is alkyl containing 5 to 8 carbon atoms or cycloalkyl containing 5 to 6 carbon atoms; with less than 1.0 equivalents of NH groups per epoxide group the hydantoin compound, of a binuclear bis-hydantoin of the formula

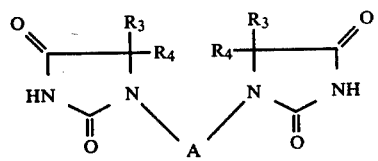

wherein $R_3$ and $R_4$ are selected from the group consisting of hydrogen or alkyl of 1 to 4 carbon atoms; or together $R_3$ and $R_4$ form tetramethylene or pentamethylene; and A is selected from the group consisting of alkylene, alkylidine or alkylidene substituted by one or more halogen atoms.

10 Claims, No Drawings

ADDUCTS CONTAINING EPOXIDE GROUPS, FROM HYDANTOIN TRISEPOXIDES AND BINUCLEAR HYDANTOINS

BACKGROUND OF THE INVENTION

The so-called "advancement" of relatively low molecular weight, low-melting or liquid epoxide resins, by reaction with polyfunctional compounds of which the functional groups react with epoxide groups, to give higher molecular weight, higher melting epoxide resins, is known. Such an advancement is intended to improve or modify, in the desired direction, the technical processing properties for certain end uses. For some end uses, for example in sintering powders and compression molding powders, an increase in the softening point or melting point can be desirable. The advancement produces, in parallel to the increase in size of the molecule, a lowering of the epoxide group content per kilogram of resin and hence a reduction in the reactivity. This has an advantageous effect, for example, when using the product as a casting and impregnating resin, in that the shrinkage or reaction becomes less and reduces the danger of cavity formation, especially in the case of larger castings.

Epoxide resins of relatively high molecular weight, and correspondingly lower epoxide content, can be manufactured in a single stage, by using a smaller storchiometric excess of epichlorohydrin than is used in the manufacture of liquid polyglycidyl ethers. An example of this is the condensation of epichlorohydrin with a polyhydric phenol, such as diomethane [2,2-bis(p-hydrophenyl)propane], in the presence of alkali. This process, however, suffers from the disadvantage that the sodium chloride produced during the condensation is difficult to wash out of the solid epoxide resins thus obtained. Furthermore, the products are as, a rule, very inhomogeneous in their composition, and contain major proportions of branched or partially crosslinked products. The disadvantages described above can be avoided, to a large extent, by manufacturing, in a first stage, low molecular weight liquid polyglycidyl ethers, which are of relatively homogeneous composition and from which sodium chloride and excess alkali can easily be washed out, and subjecting the products thus obtained to a controlled advancement reaction in a second stage. Such processes are, for example, described in U.S. Pat. Nos. 2,615,008 and 3,006,892. In these, dihydric phenols such as diomethane, dicarboxylic acids, or their anhydrides, are primarily used for the advancement.

When using dicarboxylic acids or dicarboxylic acid anhydrides, the storage stability of the advanced epoxide resins is frequently inadequate, because these compounds are active cross-linking agents or curing agents for the epoxide resins, and crosslinking reactions with free hydroxyl groups of the epoxide resin are possible even when less than stoichiometric amounts are used. Diphenols, in the advancement which has been preferred in industry, do not decrease storage stability. However, a serious disadvantage of the incorporation of the aromatic ring structure of the diphenol into the molecule of the advanced epoxide resin is an adverse affect on electrical properties, particularly the tracking resistance and arcing resistance. Such resins tend to form carbon-containing tracks during electrical discharges, and are therefore not well suited to high voltage technology.

This disadvantage is particularly serious in the case of the advancement of relatively low molecular weight epoxide resins which themselves do not contain any aromatic rings, for example, glycidyl esters of hydroaromatic dicarboxylic acids such as tetrahydrophthalic and hexahydrophthalic acid, cycloaliphatic polyepoxides of which the epoxide groups are present in the cyclopentane or cyclohexane rings, or heterocyclic nitrogen-containing glycidyl compounds such as N,N'-diglycidyl-5,5-dimethylhydantoin.

These non-aromatic epoxide resins are, as a rule, distinguished by particularly good electrical properties. In contrast to the polyglycidyl ethers of polyphenols, the chain length and the epoxide content of these non-aromatic epoxide resins cannot be varied within wide limits within the framework of a single-stage process. This can only be achieved by a two-stage process or advancement reaction.

If a diphenol is used for the advancement, then the original outstanding electrical properties of the non-aromatic epoxide resins, such as the arcing resistance and tracking resistance, are decisively worsened as a result of the incorporation of aromatic rings into the resin molecule.

U.S. Pat. No. 3,799,894 teaches that instead of diphenols or dicarboxylic acids, certain binuclear N-heterocyclic compounds containing one endocyclic NH group in each nucleus, and, in particular, bis(hydantoin) compounds or bis(dihydrouracil) compounds, can be employed for the advancement. The epoxide resins which have been advanced with the aid of such nitrogen bases show both good storage stability and excellent electrical properties. In the advancement of non-aromatic epoxide resins, the good electrical properties are fully preserved. It also provides a means to improve the electrical properties of relatively low molecular weight polyglycidyl ethers of polyphenols by the advancement with the above-mentioned heterocyclic nitrogen compounds.

This reference further teaches that the non-aromatic epoxide resins employed therein may be trifunctional, such as 1,3.5-tris($\beta$-glycidyloxypropionyl)-hexahydro-s-triazine and triglycidylisocyanurate. Both above-mentioned trifunctional non-aromatic epoxide resins possess three epoxide groups of equal reactivity, and afford partially crosslinked material upon advancement.

U.S. Pat. Nos. 3,821,243, 3,907,719 and 3,975,397 disclose the process for the preparation of binuclear heterocyclic compounds of the formula

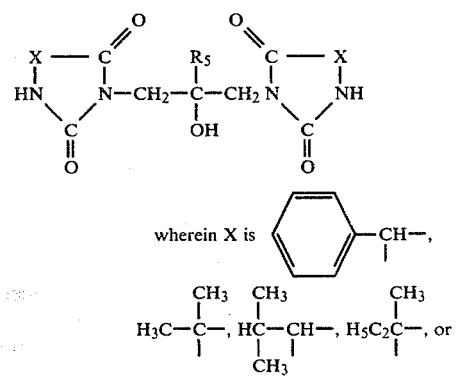

-continued

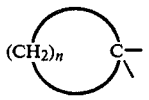

where n equals 4 or 5, and $R_5$ is hydrogen or alkyl of 1 to 4 carbon atoms; the triglycidyl compounds derived therefrom; and curable mixture comprising said triglycidyl compound and an epoxy resin curing agent.

U.S. Pat. No. 3,963,667 teaches the advancement of triglycidyl binuclear hydantoin compounds of the formula

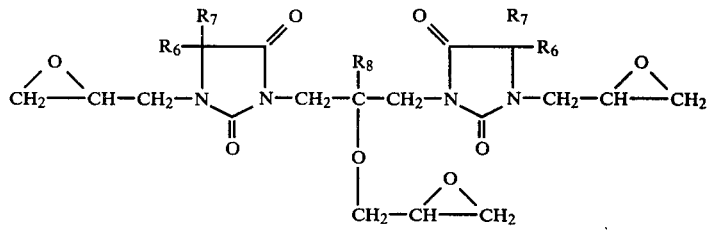

wherein $R_6$ and $R_7$ denote hydrogen or alkyl group of 1 to 4 carbon atoms or $R_6$ and $R_7$ together denote a tetramethylene or pentamethylene group and $R_8$ denotes hydrogen or alkyl group of 1 to 4 atoms with binuclear hydantoins. These adducts are combined with adducts containing amino groups to afford storage-stable molding compositions.

U.S. Pat. No. 4,071,477 discloses hydantoin diglycidyl compounds of the formula

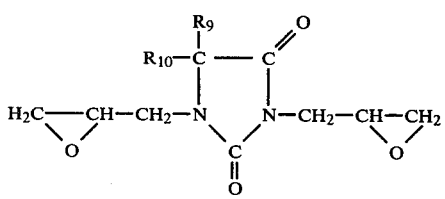

wherein $R_9$ is hydrogen, alkyl containing 1 to 8 carbon atoms or cycloalkyl containing 5 to 6 carbon atoms, and $R_{10}$ is alkyl containing 5 to 8 carbon atoms or cycloalkyl containing 5 to 6 carbon atoms.

This reference teaches that these liquid diglycidyl compounds are easily processable as casting and laminating resins, and, when cured, possess excellent resistance to water absorption.

DETAILED DESCRIPTION OF THE INVENTION

The subject of the present invention is an advanced addition product containing 1,2-epoxide groups, which is prepared by reacting a mixture of a hydantoin compound of the formula

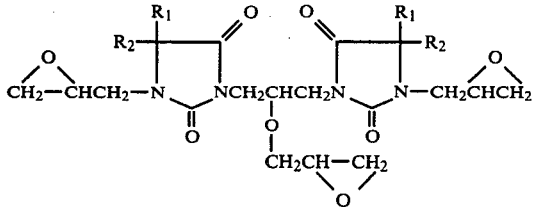

wherein $R_1$ is hydrogen, alkyl containing 1 to 8 carbon atoms or cycloalkyl containing 5 to 6 carbon atoms; and $R_2$ is alkyl containing 5 to 8 carbon atoms or cycloalkyl containing 5 to 6 carbon atoms, with less than 1.0 equivalents of NH groups per epoxide group of the hydantoin compound of a binuclear bis-hydantoin of the formula

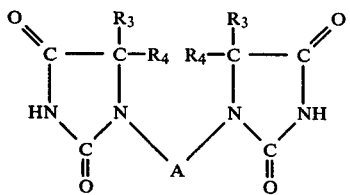

wherein $R_3$ and $R_4$ are selected from the group consisting of hydrogen or alkyl of 1 to 4 carbon atoms; or together $R_3$ and $R_4$ form tetramethylene or pentamethylene, and A is selected from the group consisting of alkylene, alkylidene or alkylidene substituted by one or more halogen atoms.

The hydantoin of the formula

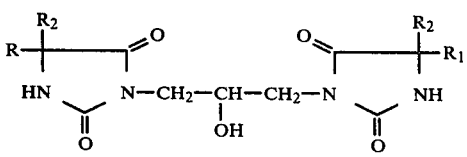

can be prepared by the well-known method of using a given ketone, sodium cyanide and ammonium carbonate.

The binuclear intermediate hydantoin of the formula can be prepared by reacting one mole of the above-mentioned hydantoin with one mole of epihalohydrin to yield the corresponding monohalohydrin compound, and said compound being condensed with one additional mole of hydantoin. The triglycidyl hydantoin compound of this invention can then be prepared in the usual way employing epichlorohydrin, tetramethylammonium chloride (TMAC) and alkali, e.g.

alkylene, alkylidene or alkylidene substituted by one or more halogen atoms.

Preferably, $R_3$ and $R_4$ are selected from the group consisting of alkyl of 1 to 4 carbon atoms; and A is an alkylene group of 1 to 7 carbon atoms.

Most preferably, $R_3$ and $R_4$ are selected from the

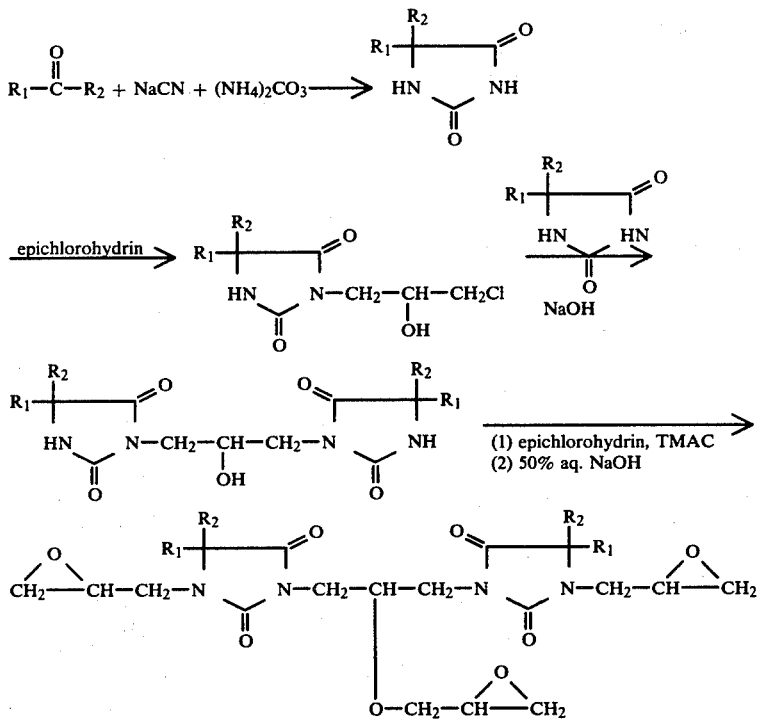

wherein $R_1$ is hydrogen, alkyl containing 1 to 8 carbon atoms or cycloalkyl containing 5 to 6 carbon atoms; and $R_2$ is alkyl containing 5 to 8 carbon atoms or cycloalkyl containing 5 to 6 carbon atoms.

The alkyl group employed herein includes both straight- and branched-chain alkyl groups, examples of which are methyl, ethyl, propyl, isopropyl, butyl, neopentyl, amyl, secamyl, isoamyl, hexyl, octyl and the like. The cycloalkyl groups include cyclopentyl and cyclohexyl.

Preferably, $R_1$ is hydrogen, alkyl containing 1 to 8 carbon atoms; and $R_2$ is alkyl containing 5 to 8 carbon atoms.

Most preferably, $R_1$ is alkyl containing 1 to 6 carbon atoms and $R_2$ is alkyl containing 5 to 6 carbon atoms.

The binuclear bis-hydantoin employed to advance said hydantoin diglycidyl compound are of the following formula

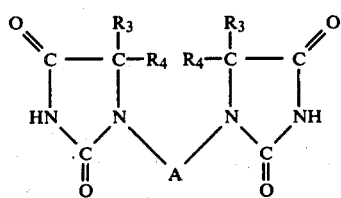

wherein $R_3$ and $R_4$ are selected from the group consisting of hydrogen or alkyl of 1 to 4 carbon atoms; or together $R_3$ and $R_4$ form tetramethylene or pentamethylene, and A is selected from the group consisting of group consisting of alkyl of 1 to 2 carbon atoms; and A is methylene.

Binuclear bis-hydantoins of the above formula, wherein A is a methylene group, may be prepared in high yield by condensing two moles of a hydantoin of the formula

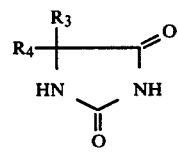

wherein $R_3$ and $R_4$ are defined as above, with formaldehyde under acidic conditions in the presence of a metal halide catalyst if necessary.

Binuclear bis-hydantoins of the above formula wherein A is an alkylidene group of the formula

wherein $R_{11}$ is alkyl or halo-substituted alkyl each containing 1 to 2 carbon atoms may be prepared according to the method described in U.S. Pat. No. 3,225,060.

Binuclear bis-hydantoins of the above formula wherein A is an alkylene group which contains more than one carbon atom may be prepared by condensing two moles of a hydantoin of the formula

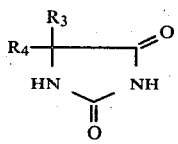

wherein R₃ and R₄ are defined above with a bis acetal of the formula

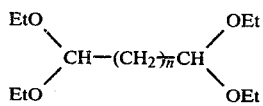

wherein n is 1 to 5, under anhydrous conditions, followed by hydrogenation of the unsaturated intermediate.

It is a major objective of this invention to provide resins with outstanding resistance to weathering. Surprisingly, it has been found that the objects of this invention have markedly superior weathering properties to prior-art advanced hydantoin epoxides. This is especially evident in coating applications.

The objects of this invention are more hydrophobic than prior-art hydantoin epoxy resins. Thus, coatings derived from the object of this invention are more resistant to the action of water or high humidity.

The new adducts of the invention are, as a rule, manufactured by heating the hydantoin triepoxide compound with the binuclear hydantoin compound and, in particular, in the temperature range of 100°–200° C., and preferably at about 120°–170° C. The reagents are, preferably, allowed to react with one another in approximately a 2:1 molar ratio, i.e., two moles of triepoxide to one mole of binuclear hydantoin compound. If much more than one mole of binuclear hydantoin is used for every two moles of triepoxide, a crosslinked intractable material might be obtained; in other words, the resin would prematurely gel. The reaction can be accelerated by adding suitable catalysts. Such catalysts are, for example, alkali hydroxides, such as sodium hydroxide; alkali halides, such as lithium chloride, potassium chloride and sodium chloride, bromide or fluoride; tertiary amines such as triethylamine, tri-n-propylamine, benzyldimethylamine, N,N'-dimethylaniline and triethanolamine; quaternary ammonium hydroxides such as benzyltrimethylammonium hydroxide; quaternary ammonium salts such as tetramethylammonium chloride, tetraethylammonium chloride, benzyltrimethylammonium chloride, benzyltrimethylammonium acetate or methyltriethylammonium chloride; hydrazines having a tertiary nitrogen atom, such as 1,1-dimethylhydrazine, which can also be employed in the quaternized form.

Depending on the choice of the starting substances, the reaction takes place, quantitatively, so rapidly that no addition of catalyst is necessary. Whilst the starting substances, are, as a rule, mixed with one another at room temperature and then brought to the reaction temperature, it is advantageous in the case of very reactive components for the polyepoxide compound to be heated by itself to the requisite reaction temperature and the other reaction components then added gradually. The progress of the reaction can be followed by titration of the epoxide groups, using samples taken during the reaction; the end product will have a defined epoxide group content.

The new advanced addition products obtained according to the process of the invention are mostly solid at room temperature; their softening points, as a rule, lie between 40° and 140° C.; the color of these rein-like adducts varies from colorless glass-clear through yellow to brown.

Because of their content of free epoxide groups these so-called "advanced" adducts react with the usual curing agents for epoxide compounds, and can therefore be crosslinked or cured by adding such curing agents, analogously to other polyfunctional epoxide compounds or epoxide resins. Possible curing agents of this kind are basic or acid compounds.

In addition to the usual curing agents for epoxy resins, simple difunctional materials, not usually considered as curing agents, may be employed. This is possible because of the high epoxide functionality of these advanced resins. Thus, simple dicarboxylic acids such as oxalic, succinic, adipic, azelaic, sebaic and the like will cure these advanced resins to crosslinked insoluble materials. Other carboxylic acids, such as carboxyl terminated polyesters and polyethers, are suitable, as well as aromatic acids such as terephthalic, isophthalic and phthalic acid. Binuclear hydantoins, such as 1,1'-methylenebis(5,5-dimethylhydantoin) and the like are suitable curing agents as well as difunctional amines such as piperazine and diphenols such as 4,4'-isopropylidenediphenol.

As suitable curing agents there may also be mentioned: amines or amides, such as aliphatic, cycloaliphatic or aromatic primary, secondary and tertiary amines, for example monoethanolamine, ethylenediamine, hexamethylenediamine, trimethylhexamethylendiamine, diethylenetriamine, triethylenetetramine, tetraethylenepentamine, N,N-dimethylpropylenediamine-1,3-bis(4-amino-3-methyl-cyclohexyl)methane, 2,2-bis(4-aminocyclohexyl)propane, 3,5,5-trimethyl-3-(aminomethyl)-cyclohexylamine ("isophoronediamine"), N-aminoethylpiperazine, Mannich bases, such as 2,4,6-tris(dimethylaminomethyl)phenol, m-phenylenediamine, p-phenylenediamine, bis(p-aminophenyl)methane, bis(p-aminophenyl)sulphone and m-xylyenediamine; adducts of acrylonitrile or monoepoxides, such as ethylene oxide or propylene oxide; polyalkylenepolyamines, such as diethylenetriamine or triethylenetetramine; adducts of polyamines, such as excess diethylenetriamine or triethylenetetramine, polyepoxides, such as diomethane polyglycidyl ethers; ketimines, e.g., derivatives of acetone or methyl ethyl ketone and bis(p-aminophenyl)-methane; adducts of monophenols or polyphenols and polyamines; polyamides, especially those from aliphatic polyamines, such as diethylenetriamine or triethylenetetramine and dimerized or trimerized unsaturated fatty acids, such as dimerized linseed oil fatty acid ("Versamid"); polymeric polysulphides ("Thiokiol"); dicyandiamide; aniline-formaldehyde resins; polyhydric phenols, for example resorcinol, 2,2-bis(4-hydroxyphenyl)propane or phenol-formaldehyde resins; boron trifluoride and its complexes with organic compounds, such as BF₃-ether complexes and BF₃-amine complexes, for example BF₃-monoethylamine complex; acetoacetanilide-BF₃-complex; phosphoric acid, triphenylphosphite; polybasic carboxylic acids and their anhydrides, for example phthalic anhydride, tetrahydrophthalic anhydride, hexahydrophthalic anhydride, 4-methylhexahydrophthalic anhydride, 3,6-endomethylene-tetrahydrophthalic anhydride, methyl-3,6-endomethylenetetrahydrophthalic anhydride (=methylnadicanhydride), 3,4,5,6,7,7-hexachlor-3,6-endomethylenetetrahydrophthalic anhydride, succinic anhydride, adipic anhydride, azelaic anhydride, sebacic anhydride, maleic anhydride, dodecenylsuccinic anhydride; pyromellitic dianhydride or mixtures of such anhydrides.

It is particularly advantageous to use curing agents which in themselves yield molding materials of good electrical properties, especially ones such as cycloaliphatic dicarboxylic acid anhydrides, for example, 4-tetrahydrophthalic anhydride or hexahydrophthalic anhydride, or cycloaliphatic polyamines, such as 2,2-bis(4'-aminocyclohexyl)propane or "isophoronediamine."

It is, furthermore, possible to use cure accelerators during the cure, particularly when using polyamides, polymeric polysulphides, dicyandiamide or polycarboxylic acid anhydrides as curing agents; such accelerators are, for example, tertiary amines, their salts or quaternary ammonium compounds, for example 2,4,6-tris(-dimethylaminomethyl)phenol, benzyldimethylamines, 2-ethyl-4-methyl-imidazole or triamylammonium phenolate; or alkali metal alcoholates, such as sodium hexanetriolate.

The expression "cure" as used here denotes the conversion of the above adducts containing epoxide groups into insoluble and infusible crosslinked products, as a rule with simultaneous shaping to give shaped articles such as catings, pressings or laminates, or to give two-dimensional structures such as coatings, lacquer films or adhesive bonds.

If desired, it is possible to add to the advanced adducts containing epoxide groups according to the invention, active diluents such as for example, styrene oxide, butylglycidyl ether, isoctylglycidyl ether, phenylglycidyl ether, cresylglycidyl ether or glycidyl esters of synthetic highly branched mainly tertiary aliphatic monocarboxylic acids ("Cardura E"), or cycloaliphatic monoepoxides such as 3-vinyl-2,4-dioxaspiro(5,5)-9,10-epoxyundecane.

The adducts according to the invention can, furthermore, be used mixed with other curable diepoxide or polyepoxide compounds. As such, there may for example, be mentioned: polyglycidyl ethers of polyhydric alcohols such as 1,4-butanediol, polyethylene glycols, polypropylene glycols or 2,2-bis-(4'-hydroxycyclohexyl)-propane; polyglycidyl ethers of polyhydric phenols such as 2,2-bis-(4'-hydroxyphenyl)propane (=diomethane),
2,2-bis-(4'-hydroxy-3',5'-dibromophenyl)propane bis-(4-hydroxyphenyl)sulphone
1,1,2,2-tetrakis-(4-hydroxyphenyl)ethane or condensation products of formaldehyde with phenols produced in an acid medium, such as phenol novolacs or cresol novolacs; polyglycidyl esters of polycarboxylic acids, such as phthalic acid diglycidyl ester, tetrahydrophthalic acid diglycidyl ester or hexahydrophthalic acid diglycidyl ester; triglycidyl isocyanurate, N,N-diglycidyl-5,5-dimethylhydantoin, or aminopolyepoxides such as are obtained by dehydrohalogenation of the reaction products of epihalogenohydrin and primary and secondary amines such as aniline or 4,4'-diaminodiphenylmethane; also alicyclic compounds containing several epoxide groups, such as vinylcyclohexene-diepoxide,
dicyclopentadienediepoxide,
ethylene glycol-bis-(3,4-epoxytetrahydrodicyclopentadien-8-yl)ether,
(3,4-epoxycyclohexylmethyl)-3,4-epoxycyclohexanecarboxylate,
(3,4'-epoxy-6'-methylcyclohexylmethyl)-3,4-epoxy-6-methylcyclohexanecarboxylate,
bis(cyclopentyl)ether diepoxide or
3-(3',4'-epoxycyclohexyl)-2,4-dioxaspiro-(5,5)-9,10-epoxyundecane.

The subject of the present invention, therefore, also includes curable mixtures which are suitable for the manufacture of shaped articles, including two-dimensional structures, and which contain the advanced adducts containing epoxide groups according to the invention, optionally together with other diepoxide or polyepoxide compounds and also curing agents for epoxide resins such as polyamines or polycarboxylic acid anhydrides.

The adducts according to the invention, or their mixtures with other polyepoxide compounds and/or curing agents, can furthermore be mixed, at any stage before cure, with usual modifiers such as extenders, fillers and reinforcing agents, pigments, dyestuffs, organic solvents, plasticizers, and the like.

As extenders, reinforcing agents, fillers and pigments which can be employed in the curable mixtures according to the invention there may, for example, be mentioned: coal tar, bitumen, glass fibers, boron fibers, carbon fibers, cellulose, polyethylene powder, polypropylene powder, mica, asbestos, quartz powder, slate powder, aluminum oxide trihydrate, chalk powder, gypsum, antimony trioxide, bentones, silica aerogel ("Aerosil"), lithopone, barite, titanium dioxide, carbon black, graphite, iron oxide or metal powder such as aluminum powder or iron powder.

The following are, for example, suitable as organic solvents for modifying the curable mixtures; toluene, xylene, n-propanol, butyl acetate, acetone, methyl ethyl ketone, diacetone-alcohol, ethylene glycol monomethyl ether, monoethyl ether and monobutyl ether.

Dibutyl, dioctyl and dinonyl phthalate, tricresyl phosphate, trixylenyl phosphate and also polypropylene glycols may for example, be employed as plasticizers for modifying the curable mixtures.

Especially for use in the lacquer field, the new adducts containing epoxide groups can furthermore be partially or completely esterified in a known manner with carboxylic acids, such as, especially, higher unsaturated fatty acids. It is furthermore possible to add other curable synthetic resins, for example, phenoplastics or aminoplastics, to such lacquer resin formulations.

It is also possible to add other usual additives, for example, flameproofing agents, agents for conferring thixotrophy, flow control agents such as silicones, cellulose acetobutyrate polyvinyl butyral, waxes, stearates and the like (which are in part also used as mold release agents) to the curable mixtures.

The curable mixtures can be manufactured in the usual manner, with the aid of known mixing equipment (stirrers, kneaders, rollers, and the like).

The curable epoxide resin mixtures are, especially, employed in the fields of surface protection, the electric industry, laminating processes and the building industry. Each particular end use requires a suitable formulation, in the unfilled or filled state, optionally in the form of solutions or emulsions, as paints, lacquers, sintering powders, compression molding compositions, dipping resins, casting resins, injection molding formulations, impregnating resins and adhesives, as tool resins, laminating resins, sealing and filling compositions, floor covering compositions and binders for mineral aggregates.

A main field of application lies in the field of compression molding powders and of sintering powders. Here, the epoxide resin powder mixtures can be processed with or without pressure, according to known processes, such as fluidized bed sintering, electrostatic fluidized bed sintering, spraying, electrostatic spraying, compression molding and the like.

In the examples which follow, unless otherwise stated, parts denote parts by weight and percentages denote percentages by weight. The relationship of the parts by volume to the parts by weight is as that of the millititer to the gram.

EXAMPLE 1

Preparation of
1,3-Bis-(5',5'-dimethyl-1'-glycidylhydantoinyl-3'-)-2-oxyglycidylpropane Step 1—A solution of 3 moles (385 g) of 5,5-dimethylhydantoin in 225 ml water is heated, with stirring, to 75° C. In the course of 30 minutes, 1.55 moles (124 g) of 50% aqueous sodium hydroxide is added in small portions. During the addition, the temperature is increased to 83° C. Over a period of 70 minutes, 1.54 moles (142 g) of epichlorohydrin is added, during which time the reaction temperature is maintained between 85° and 90° C. The resulting clear, colorless solution is stirred for an additional 15 minutes at 85° C.

The aqueous solution is diluted with 11.7 moles (1080 g) epichlorophydrin, and stirred for 5 minutes at 70° C. The resulting mixture is transferred, warm, to a separatory funnel. After phase separation, the lower aqueous phase is discarded, and the upper organic phase is transferred to a reaction flask for the second step.

Step 2—The organic phase from Step 1 is diluted with 10.8 moles (1000 g) epichlorohydrin. The mixture is heated to 70° C., and vacuum is applied to initiate azeotropic water removal by recirculating distillation, with return of the heavier epichlorohydrum phase. Distillation is continued until no further evolution of water is observed. The final temperature of the mixture is 96° C.

To the mixture at 96° C. is added 30 g of 50% aqueous tetramethylammonium chloride. The mildly exothermic reaction causes a temperature rise to 103° C. The mixture is stirred for an additional 30 minutes at 100°–105° C.

By careful application of vacuum, a recirculating distillation is initiated at 55° C. Over a period of 3 hours, 5.3 moles (425 g) of 50% aqueous sodium hydroxide is added with concurrent removal of water by azeotropic distillation. During the course of the addition, sodium chloride is precipitated as a fine solid. The azeotropic removal of water is continued after completion of the sodium hydroxide addition, until no further evolution of water is observed.

The reaction mixture is filtered free of salt and washed, in a separatory funnel, with 150 ml of water. The lower organic phase is dried over sodium sulfate, filtered and subsequently stripped to constant weight at reduced pressure. The product is 648 g (90% of theoretical) of a clear, yellow viscous liquid with an epoxy equivalent weight (by titration) of 150.3 (calculated 160.0).

The elemental analysis is as follows:
Calculated for $C_{22}H_{32}N_4O_8$: 54.99% C; 6.71% H; 11.66% N; Found: 54.37% C; 6.79% H; 10.91% N

EXAMPLE 2

Preparation of
1,3-Bis-(5'-ethyl-5-methyl-1'-glycidylhydantoinyl-3'-)-2-oxyglycidylpropane In the manner described in Example 1, 3 mole (426 g) 5-ethyl-5-methylhydantoin is caused to react first with 1.55 mole (124 g) aqueous sodium hydroxide and 1.54 mole (142 g) epichlorohydrin in aqueous solution and, subsequently, with excesses of epichlorohydrin (20.6 mole, 1906 g) and sodium hydroxide (5.4 mole, 433 g, 50% aqueous) in the presence of tetramethylammonium chloride (40 g of 50% aqueous solution) to yield a trifunctional liquid epoxy resin. The resin is obtained in 89% yield (674 g of a calculated 761 g based on charge of 5-ethyl-5-methylhydantoin). The epoxy equivalent weight (by titration) is 172 (calculated 169). Elemental analysis is as follows:
Calculated for $C_{24}H_{35}N_4O_8$: 56.79% C; 6.95% H; 11.04% N; Found: 56.40% C; 7.11% H; 10.80% N; 0.54% Cl

EXAMPLE 3

Preparation of
1,3-Bis-(5'-sec-amyl-5'-ethyl-1'-glycidylhydantoinyl-3'-)-2-oxyglycidylpropane In the manner described in Example 1, 7 moles (1430 g) 5-sec-amyl-5-ethylhydantoin is caused to react first with 3.7 moles (298 g) 50% aqueous sodium hydroxide and 3.7 moles (343 g) epichlorohydrin in aqueous mixture (2160 ml water) and, subsequently, with excesses of epichlorohydrin (40.9 mole, 3787 g) and sodium hydroxide (13 mole, 1040 g, 50% aqueous) in the presence of tetramethylammonium chloride (72 g of 50% aqueous solution) to yield a trifunctional liquid epoxy resin. The product is obtained in 91% yield (2034 g of a theoretical 2239 g based on charge of 5-sec-amyl-5-ethylhydantoin). The epoxy equivalent weight (by titration) is 217 (theoretical 207). Elemental analysis is as follows:
Calculated for $C_{35}H_{52}N_4O_8$: 61.42% C; 8.33% H; 9.08% N; Found: 61.27% C; 8.60% H; 8.79% N; 0.72% Cl

EXAMPLE 4

1,3-Bis-(5',5'-dimethyl-1'-glycidylhydantoinyl-3')-2-oxyglycidylpropane Advanced with
1,1'-Methylenebis(5,5-Dimethylhydantoin) (Advanced Resin No. 1)

1,3-Bis-5',5'-dimethyl-1'-glycidylhydantoinyl-3'-)-2-oxyglycidylpropane (33.17 g, 199.7 meq), having an epoxy value of 6.02 eq/kg, is charged to a resin flask, and the flask immersed in a preheated 175° C. oil bath. The resin is stirred for 10 minutes to achieve thermal equilibration. Finely ground 1,1'-methylenebis-(5,5-dimethylhydantoin) (8.93 g, 66.5 meq) is added to the stirring resin, through a funnel, over a period of 30 minutes. The reaction is continued an additional 60 minutes at 175° C. The finished material is poured out hot onto an aluminum sheet, allowed to cool, broken up and bottled. The product is a light yellow, clear brittle solid at room temperature, epoxy value 2.92 eq/kg (92% of theoretical) and melts 86°–110° C.

EXAMPLE 5

1,3-Bis-(5',5'-dimethyl-1'-glycidylhydantoinyl-3')-2-oxyglycidylpropane Advanced with 1,1'-Methylenebis-(5-ethyl-5-methylhydantoin) (Advanced Resin No. 2)

In the manner described in Example 4, 34.6 g (208.4 meq) of 1,3-Bis-5',5'-dimethyl-1'-glycidylhydantoinyl-3'-)-2-oxyglycidylpropane, having an epoxy equivalent of 6.02 eq/kg, is reacted with 10.31 g (69.6 meq) of 1,1'-methylenebis-(5-ethyl-5-methylhydantoin) at 175° C. The product is a light yellow, clear brittle solid at room temperature, epoxy value 2.92 eq/kg (94.5% of theoretical), and melted at 78°–105° C.

EXAMPLE 6

1,3'-Bis-(5'-sec-amyl-5'-ethyl-1'-glycidylhydantoinyl-3'-)-2-oxyglycidylpropane Advanced with 1,1'-Methylenebis(5,5-Dimethylhydantoin) (Advanced Resin No. 3)

In the manner described in Example 4, 500 g (2.44 eq) of 1,3-Bis-5'-sec-amyl-5'-ethyl-1'-glycidylhydantoinyl-3')-2-oxyglycidylpropane, having an epoxy value of 4.88 eq/kg, is reacted with 108.01 g (0.805 eq) 1,1'-Methylenebis-(5,5-dimethylhydantoin) at 175° C. The product is a light yellow, clear, brittle solid at room temperature, epoxy value 2.69 eq/kg (100% of theoretical), and melted at 61°–73° C.

EXAMPLE 7

1,3-Bis-(5'-sec-amyl-5'-ethyl-1'-glycidylhydantoinyl-3'-)-2-oxyglycidylpropane Advanced with 1,1'-Methylenebis-(5-ethyl-5-methylhydantoin) (Advanced Resin No. 4)

In a manner similar to that described in Example 6, 2.0 equivalents 1,3-Bis-(5'-sec-amyl-5'-ethyl-1-glycidylhydantoinyl-3'-)-2-oxyglycidylpropane, having an epoxy value of 4.88 eq/kg, is reacted with 1.0 equivalents of 1,1'-methylene-bis-(5-ethyl-5-methylhydantoin). The light yellow, clear, brittle solid product was labeled Advanced Resin No. 4.

EXAMPLE 8–12

In a manner similar to that described in Example 6, using the reactants, 1,3-bis-(5'-sec-amyl-5'-ethyl-1'-glycidylhydantoinyl-3'-)-2-oxyglycidylpropane epoxy resin and 1,1'-methylenebis (5,5-dimethylhydantoin) advancing agent, the following higher molecular weight solid resins were prepared by varying the ratio of the two reactants:

| Example | Adv. Resin No. | Epoxy Value (eq/kg) Theory | Actual | Melting Pt. |
|---|---|---|---|---|
| 8 | 5 | 2.68 | 2.43 | 63–76° C. |
| 9 | 6 | 2.40 | 2.35 | 63–79° C. |
| 10 | 7 | 2.20 | 2.15 | 68–80° C. |
| 11 | 8 | 2.00 | 2.01 | 78–89° C. |
| 12 | 9 | 1.75 | 1.68 | 91–104° C. |
| 13 | 10 | 1.50 | 1.48 | 96–107° C. |

EXAMPLES 14–22

Coating Formulations of the Advanced Resins

The following formulations of the advanced resins prepared in the above Examples were applied to steel test panels and evaluated as coatings.

| Formulation (parts) | 14 | 15 | 16 | 17 | 18 | 19 | 20 | 21 | 22 |
|---|---|---|---|---|---|---|---|---|---|
| Resin No. 1 | 100 | 100 | 100 | | | | | | |
| Resin No. 3 | | | | 100 | | | | | |
| Resin No. 6 | | | | | 100 | | | | |
| Resin No. 8 | | | | | | 100 | 100 | 100 | 100 |
| Azelaic Acid | 27.5 | | | 25.4 | 22.9 | 19 | | | |
| Adipic Acid | | 21.3 | | | | | | | |
| PE-1* | | | | | | | 53.3 | | |
| PE-2** | | | 66.2 | | | | | 47.8 | |
| PE-3*** | | | | | | | | | 65.9 |
| Imidazole | 1 | 1 | 1 | 1 | 1 | 1 | 1 | 1 | 1 |
| TiO$_2$ | — | — | 60 | — | — | — | 60 | 60 | 60 |
| Bake Cycle | 175° C. | 200° C. | 125° C. | 175° C. | 175° C. | 175° C. | 175° C. | 175 ° C. | 175° C. |
| | 30 min. | 15 min. | 15 min. | 15 min. | 25 min. | 15 min. | 15 min. | 15 min. | 15 min. |
| Properties | | | | | | | | | |
| Appearance | sl. yel. | yel. | glossy white | good glossy | good glossy | good glossy | white glossy | white glossy | white glossy |
| Film Thickness (mils) | 1.3 | 0.9 | 1.3–1.7 | 1.2 | 1.0–1.5 | 1.3 | 1.0–1.5 | 1.0–1.6 | 1.1–1.6 |
| MEK Rub Test | >100 | >100 | >100 | >100 | >100 | >100 | >100 | >100 | >100 |
| Cross-Cut Adhesion | pass | pass | pass | pass | pass | pass | pass | pass | pass |
| Gardner Impact direct (in.-lbs.) | 160 | 24 | 160 | 160 | 160 | 160 | 160 | 160 | 160 |
| Gardner Impact reverse (in.-lbs.) | 140 | 8 | 160 | 150 | 140 | 160 | 160 | 160 | 160 |

*the reaction product of three moles of adipic acid with two moles 1,4-butanediol
**the reaction product of three moles of adipic acid with two moles ethylene glycol
***the reaction product of three moles azelaic acid with two moles 1,4-butanediol Formulations 14, 16, 18, 19 and 21, all pigmented with 60 parts/100 parts resin, were coated onto steel test panels and subjected to outdoor weathering in Florida. The panels faced south at 45° to the horizontal and glass readings (60°) were made periodically to estimate the weatherability of the coatings.

| | 60° Gloss Readings | | | | |
|---|---|---|---|---|---|
| Formulation | 14 | 16 | 18 | 19 | 21 |
| Initial | 84 | 87 | 84 | 84 | 85 |
| 3 months | 58 | 10 | 84 | 83 | 79 |
| 6 months | 14 | 0 | 82 | 74 | 63 |
| 9 months | 0 | 0 | 57 | 44 | 50 |

What is claimed is:

1. An advanced addition product containing 1,2-epoxide groups which is prepared by reacting a mixture of (a) a hydantoin compound of the formula

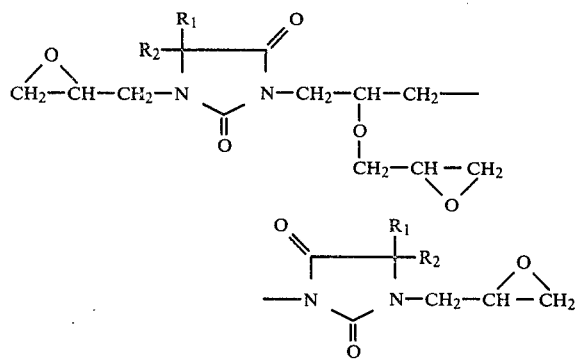

wherein $R_1$ is hydrogen, alkyl containing 1 to 8 carbon atoms, or cycloalkyl containing 5 to 6 carbon atoms; and $R_2$ is alkyl containing 5 to 8 carbon atoms; with (b) less than 1.0 equivalents of NH groups per epoxide group of (a) a binuclearbishydantoin compound of the formula

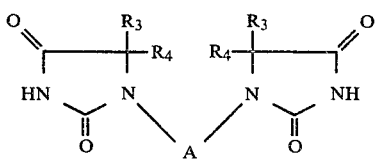

wherein $R_3$ and $R_4$ are selected from the group consisting of hydrogen or alkyl of 1 to 4 carbon atoms; or together $R_3$ and $R_4$ form tetramethylene or pentamethylene; and A is selected from the group consisting of alkylene, alkylidene or alkylidene substituted by one or more halogen atoms.

2. An advanced addition product according to claim 1 wherein A is an alkylene group of 1 to 7 carbon atoms; and $R_3$ and $R_4$ are alkyl of 1 to 4 carbon atoms.

3. An advanced addition product according to claim 1 wherein A is methylene; and $R_3$ and $R_4$ are alkyl of 1 to 2 carbon atoms.

4. An advanced addition product according to claims 1 or 3 wherein $R_1$ is hydrogen, alkyl containing 1 to 8 carbon atoms, and $R_2$ is alkyl containing 5 to 8 carbon atoms.

5. An advanced addition product according to claims 1 or 3 wherein $R_1$ is alkyl containing 1 to 6 carbon atoms and $R_2$ is alkyl containing 5 to 6 carbon atoms.

6. An advanced addition product according to claim 1 wherein $R_1$ is ethyl; $R_2$ is sec-amyl; $R_3$ and $R_4$ are methyl; and A is methylene.

7. An advanced addition product according to claim 1 wherein $R_1$ is ethyl; $R_2$ is sec-amyl; $R_3$ is methyl; $R_4$ is ethyl; and A is methylene.

8. A curable composition comprising the advanced addition product according to claim 1 and an epoxy curing agent selected from the group consisting of polybasic carboxylic acids and polycarboxylic acid anhydrides.

9. A curable composition according to claim 8 wherein the epoxy curing agent is a dicarboxylic acid or a difunctional carboxyl terminated polyester.

10. A curable composition according to claims 8 or 9 which further comprises extenders, fillers, reinforcing agents, pigments, dyestuffs, organic solvents, plasticizers or a mixture thereof.

* * * * *